United States Patent
Worman, Jr.

(10) Patent No.: US 6,454,284 B1
(45) Date of Patent: Sep. 24, 2002

(54) TORSION BAR SUSPENSION WITH POWER HEIGHT ADJUSTMENT

(75) Inventor: William E. Worman, Jr., Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/439,266

(22) Filed: Nov. 12, 1999

Related U.S. Application Data
(60) Provisional application No. 60/143,792, filed on Jul. 14, 1999.

(51) Int. Cl.[7] .............................................. B60G 11/20
(52) U.S. Cl. .......................... 280/124.167; 280/6.157; 280/124.106; 280/124.166; 280/124.101
(58) Field of Search .................... 280/124.167, 124.166, 280/124.101, 124.102, 6.157, 124.106, 124.137

(56) References Cited

U.S. PATENT DOCUMENTS

| | | | |
|---|---|---|---|
| 3,831,966 A | * 8/1974 | Grosseau | 280/124 B |
| 4,635,958 A | * 1/1987 | Yonemoto | 280/664 |
| 4,641,856 A | * 2/1987 | Reichenbach | 280/772 |
| 4,919,441 A | * 4/1990 | Marier et al. | 280/21.1 |
| 5,556,083 A | * 9/1996 | Furihata et al. | 267/777 |
| 6,056,304 A | * 5/2000 | Brambilla | 280/124.111 |

OTHER PUBLICATIONS

General Motors Corporation, M/L Van Service Manual, vol. 1, pp. 3–81 thru 3–85, 1999.

* cited by examiner

*Primary Examiner*—Robert P. Olszewski
*Assistant Examiner*—Christopher Buchanan
(74) *Attorney, Agent, or Firm*—Laura C. Hargitt

(57) ABSTRACT

A torsion bar suspension for an automotive vehicle includes powered means for remotely adjusting the trim height of the vehicle by varying the torque applied to the torsion bars. Height adjustment may be up or down or both from a normal running height. The suspension may be made capable of lowering vehicle height to allow entry into or passage through a low clearance location, such as a parking garage or overpass. Alternatively, the suspension could be capable of raising the vehicle height for passage over rough terrain. Various embodiments of adjusting mechanisms are disclosed including, for example, lever and wheel type torsion adjusting means with linear or rotary actuators.

7 Claims, 5 Drawing Sheets

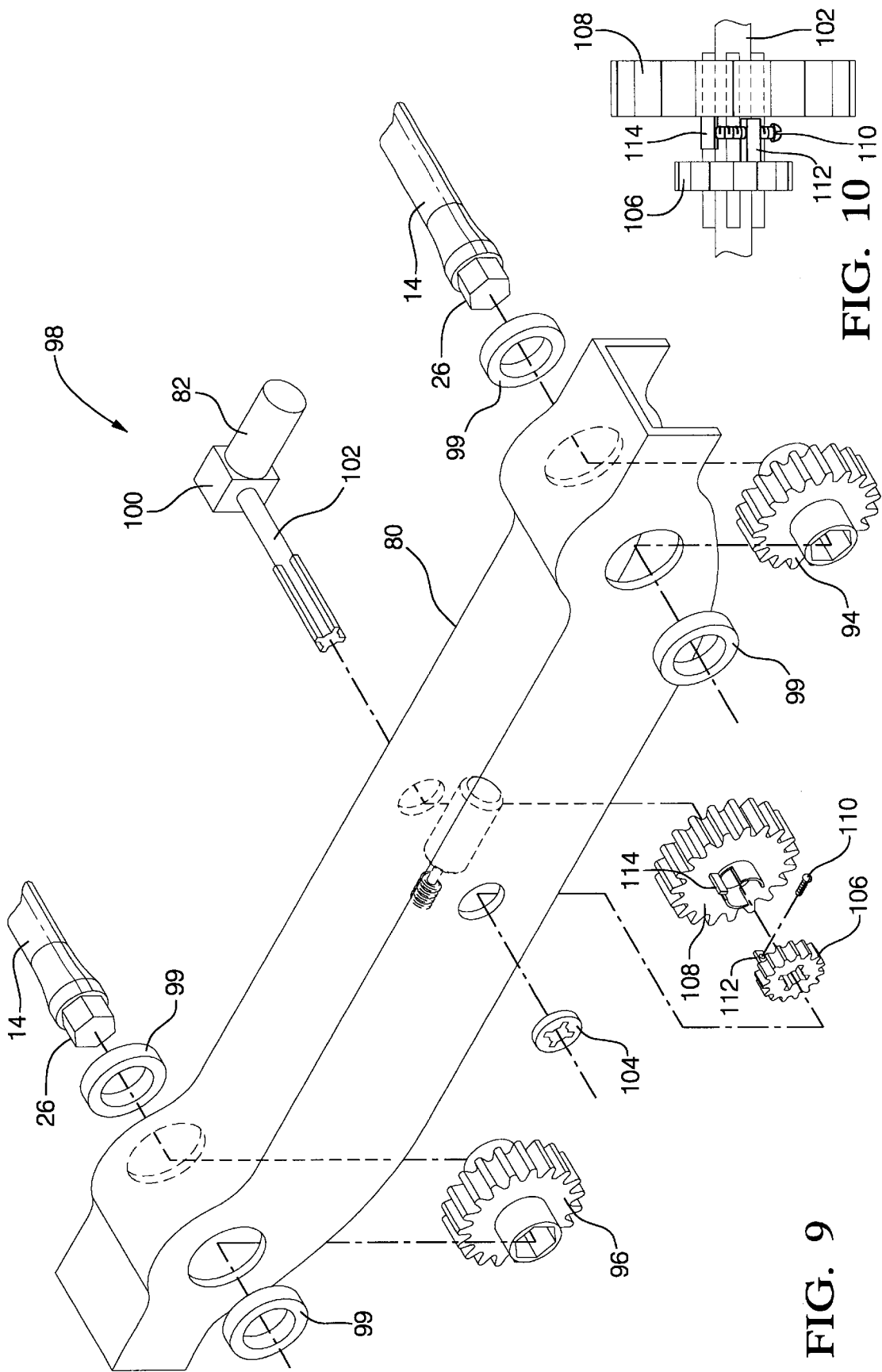

TORSION BAR SUSPENSION WITH POWER HEIGHT ADJUSTMENT

This application claims the benefit of U.S. Provisional Application No. 60/143,792, filed Jul. 14, 1999.

TECHNICAL FIELD

This invention relates to vehicle suspensions and, more particularly, to a torsion bar type suspension with power trim height adjusting means.

BACKGROUND OF THE INVENTION

It is known in the art to provide a vehicle suspension including torsion bars as the vehicle-supporting spring elements. In a typical embodiment, a torsion bar is connected with the lower control arm connecting an associated one of the vehicle wheels with the vehicle body. The torsion bar typically extends longitudinally, having an opposite end supported in a frame or body cross member. The cross member supported end is attached to a torsion lever which applies a predetermined torsion force for supporting the vehicle. An adjusting screw mounted in either the cross member or the lever engages the other for manually adjusting the lever to provide the desired torque setting of the torsion bar.

SUMMARY OF THE INVENTION

The present invention provides power adjustable means for remotely varying the torque applied to the torsion bars of a vehicle torsion bar suspension so that the trim height of the suspension may be remotely controlled by the vehicle operator. The height adjustment may be up or down from a normal running height. The suspension may be made capable of lowering vehicle height to allow entry into or passage through a low clearance location, such as a parking garage or overpass. Alternatively, the suspension could be capable of raising the vehicle height for passage over rough terrain. Various forms of adjusting mechanisms may be utilized including, for example, lever and wheel type torsion adjusting means with linear or rotary actuators.

For example, the torsion member may be a torsion lever similar to that of the manually adjusted prior art embodiment. A linear actuator is provided between the torsion lever and the vehicle cross member to adjust the torsion lever in response to an operator initiated signal. The linear actuator may be of any suitable type, such as a pneumatic or hydraulic cylinder or device, or an electric motor driven actuator, such as a powered screw or the like. The actuator is adjustable to at least two positions and rotates the torsion lever between these positions to establish either a high or low height position of the vehicle suspension in which the vehicle can be operated.

For some types of actuators, such as a hydraulic cylinder or bag, position locks may be required to fix the associated torsion levers in their adjusted positions so that the spring rates of the torsion bar suspension will not be changed by the effect of the pneumatic actuator applied as part of the system. To adjust the mechanism, the locks would first be released so that the actuators could move the torsion levers to another position after which the locks would again be applied, if required.

A feature of these embodiments of the invention is that they may be relatively easily applied to an existing torsion bar suspension system that does not have a remotely adjustable trim height feature. The modifications to the existing system would only affect a part of the vehicle to which the torsion bars are anchored and would involve packaging of the lever arm actuator and lock/latch mechanism, if required.

In other embodiments of the invention, the torsion member could be a wheel, such as a sprocket, gear or the like, driven by a power drive of any suitable type, One example is an electric motor driven worm drive connected to a chain drive sprocket. The drive sprocket is connected by chain connectors with driven adjuster sprockets on both of the torsion bars supporting one end of a vehicle. Remotely controlled operation of the worm drive actuates both driven sprockets to adjust both torsion bars simultaneously to vary the vehicle trim height at the associated vehicle end.

These and other features and advantages of the invention will be more fully understood from the following description of certain specific embodiments of the invention taken together with the accompanying drawings.

BRIEF DESCRIPTION OF THE DRAWINGS

In the drawings:

FIG. 9 is an exploded rear pictorial view of a fifth embodiment; and

FIG. 10 is a side view of associated drive sprockets in the embodiment of FIG. 9.

DESCRIPTION OF THE PREFERRED EMBODIMENT

Figure 1:
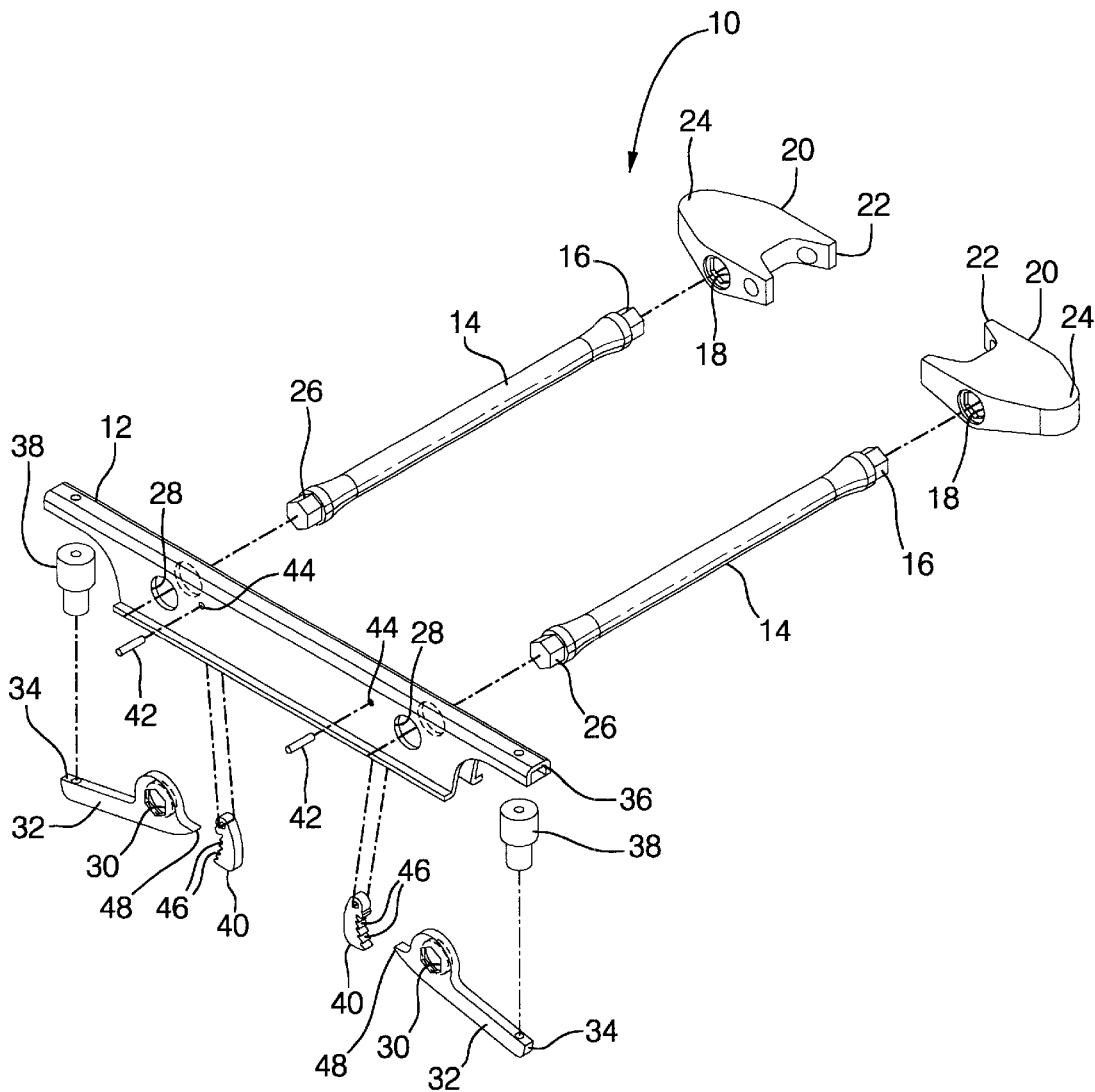
FIG. 1 is an exploded pictorial view of a suspension according to the invention and intended for use at one end of a vehicle.

Referring first to FIG. 1 of the drawings in detail, numeral 10 generally indicates a first embodiment of torsion bar suspension with power height adjustment for an automotive vehicle. Suspension 10 includes a body cross member 12 which is preferably attached to longitudinal frame or body members, not shown. The embodiment of FIG. 1 represents various forms of torsion bar suspensions which may be used as front or rear suspensions of a vehicle.

In the illustrated embodiment, suspension 10 is applied to an independent suspension which is typically the front suspension of a vehicle, although it could be equally well be used in an independent rear suspension. The suspension shown includes a pair of longitudinal torsion bars 14. In the particular embodiment illustrated, the torsion bars 14 have hexagonal front ends 16 which are received within hexagonal openings 18 in lower control arms 20 of a vehicle front suspension. The control arms 20 have inner ends 22 which are conventionally pivotally attached to the vehicle frame or body, not shown, and outer ends 24 which each connect with or support a spindle, not shown, of an associated wheel of the vehicle.

Torsion bars 14 also have opposite rear ends 26 which extend into openings 28 in the cross member 12. The rear ends 26 are also hexagonally shaped and are received in hexagonal openings 30 of torsion levers 32 that are carried within the cross member 12 in alignment with the openings 28. The torsion levers have outer ends 34 distal from the openings 30 and extending beneath outer ends 36 of the cross member 12.

Linear actuators 38 are mounted between the outer ends 36 of the cross member and the outer ends of the corresponding torsion levers extending therebelow. The linear actuators 38 may be of any suitable type, such as pneumatic, hydraulic, electrically actuated screw or the like, and are operable to extend or contract in order to rotate the torsion levers around the axes of the torsion bars to which they are connected and between upper and lower positions of the outer ends of the torsion levers.

The suspension may also include, as illustrated, locks 40 which are pivotally mounted on pins 42 in openings 44 of the cross member 12. The locks 40 have outwardly facing notches 46 which are engagable with lock protrusions 48 extending from the torsion bars at inner ends adjacent their openings 30. A lock release mechanism, such as cables attached to the lower ends of the lock members, may be required for disengaging them from the lock protrusions when a change in the adjusting position is required. Any suitable form of lock release devices, not shown, may be utilized.

Operation of the suspension mechanism as above described will be discussed subsequently in connection with a slightly modified alternative embodiment illustrated in FIGS. 2–4. In these figures, numeral 50 generally indicates the slightly modified embodiment, only a portion of which is shown. Suspension 50 is carried by a longitudinal member 52 of the frame or body of an associated vehicle. A cross member 54, one end of which is shown, is attached to the longitudinal member 52 and to a like member on the other side of the vehicle body. The cross member includes, at the illustrated end, openings 28 which are formed in the sides of a U-shaped portion of the cross member 54 having a downwardly facing open side.

The inner end 56 of a torsion lever 58 is received in the U-shaped portion with a hexagonally shaped opening 30 aligned on the axis of openings 28. The lever 58 extends outward to an outer end 60 which is attached to a linear actuator 62 that also engages an outer end of the cross member 54. A torsion bar 14 of the suspension includes a hexagonally shaped rear end 26, as in the first described embodiment. The torsion bar is twisted to provide the desired torque, after which the rear end 26 is inserted through one of the openings 28 into the hexagonal opening 30 of the torsion lever. This locks the torsion bar in place and applies a desired torque to the associated control arm at the other end of the torsion bar which thereby lifts the vehicle body to a predetermined desired trim height.

Figure 2:
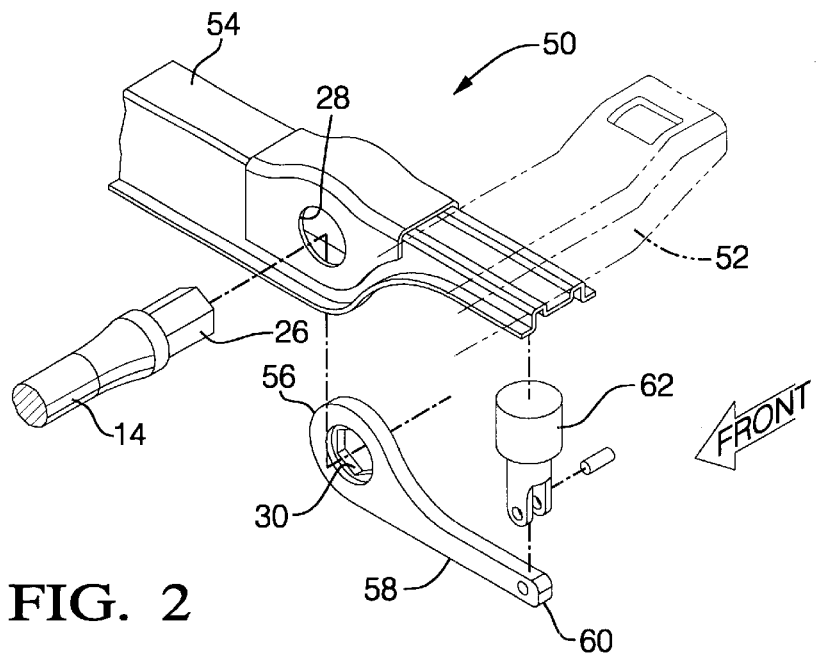
FIG. 2 is a fragmentary exploded pictorial view of an actuating mechanism for an alternative embodiment.
Figure 3:
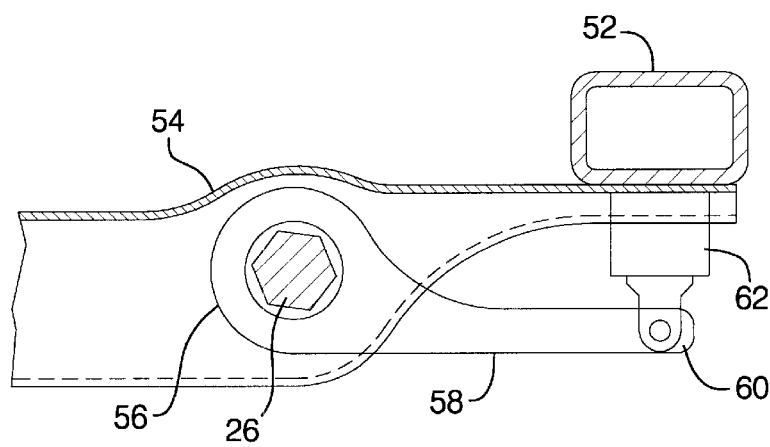
FIG. 3 is a cross-sectional rear view showing the mechanism of FIG. 2 in a lowered trim height position.
Figure 4:
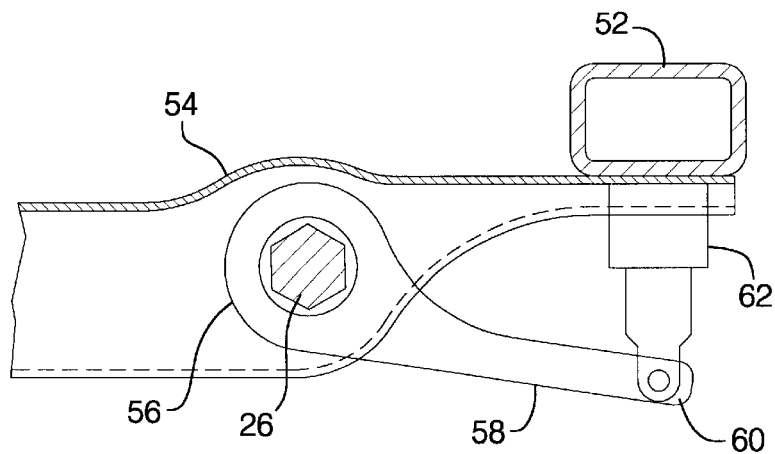
FIG. 4 is a view similar to FIG. 3 showing the mechanism in a raised trim height position.

The linear actuators 62 may be of any desired type but, in the embodiment of FIGS. 2–4, as illustrated, the use of hydraulic or electrically actuated mechanical screw type actuators might be preferable. Suitable power supply means for operating the actuators 62 are, of course, required but are not shown since they may be of any suitable type.

Operation of the embodiment of FIG. 1 and the similar but slightly modified embodiment of FIGS. 2–4 will now be described. After assembly of the torsion bar 14 with its front end engaged with the lower control arm and its rear end engaged with the associated torsion lever 32 or 58, the torque applied to the torsion bars by the positioning of the associated torsion lever maintains the vehicle ride height at a desired value. As shown in FIG. 3, the linear actuator 62 is compressed to its shortest length which maintains the torque on the torsion bar at the lowest desired level. This results in the trim height of the vehicle being maintained at the lowest desired level so that the vehicle rides relatively close to the ground. In order to increase the trim height so that the vehicle body rides higher from the ground, the linear actuator 62 is extended as shown in FIG. 4. This rotates the torsion lever 58 (or 32) clockwise as shown in the drawing, increasing the torque applied to the torsion bar 14 through its end 26 and thus increasing the supporting force of the torsion bar. The vehicle body is thus raised to a new higher trim height of the vehicle body above the ground as compared to that of the low trim height established by the arrangement of FIG. 3. To return to the low trim height, it is only necessary to retract the linear actuator 62 to the original position shown in FIG. 3 so that the vehicle body is lowered to the low trim height position.

The embodiment of FIGS. 2–4 is suitable particularly for use with mechanical actuators using a screw which holds its adjusted position or hydraulic actuators which have low compressibility of the hydraulic fluid, since these devices do not comprise compressible spring-like members added in series with the suspension force provided by the torsion bars 14. Thus, the spring rate of the torsion bars is not affected by provision of the linear actuators in the suspension assembly. However, if a pneumatic cylinder or air bag is provided as a linear actuator for moving the torsion lever, as may be the case in the embodiment of FIG. 1, the pneumatic device being a compressible member acts in series with the resilient bar 14 to provide a new combined spring rate which may adversely affect the ride quality of the associated vehicle.

This may be overcome by use of locks 40, shown in FIG. 1, which include notches 46 that are engaged by protrusions or tongues 48 of the associated torsion levers 32. The notches are arranged so that the lever engages the lower notch when the suspension is in the lower trim height position and the lever engages the upper notch when the lever 32 is in the high trim height position with its linear actuator extended. In either position, the notches and associated protrusions are so configured that they lock the levers in their adjusted positions until the lock members 40 are released by a suitable cable or other type of release mechanism, not shown. Release of the locks is thus required prior to power adjustment of the suspension between the high and low trim height positions. Otherwise, the operation of the embodiment of FIG. 1 is the same as that of the embodiments of FIGS. 2–4. The lock members lock out the pneumatic actuators 38 from acting as springs in series with the torsion bars 14 and thus return the torsion bar suspension to the originally intended spring rate.

Figure 5:
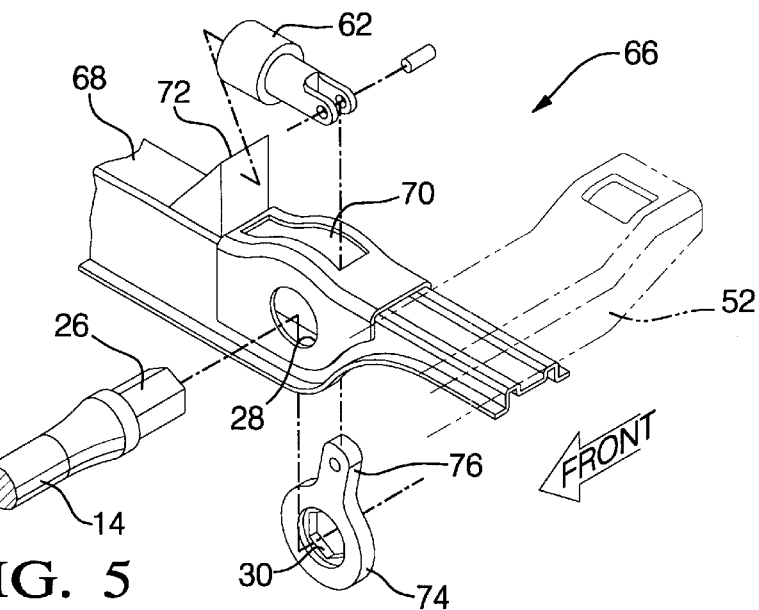
FIG. 5 is a view similar to FIG. 2 showing another alternative embodiment.
Figure 6:
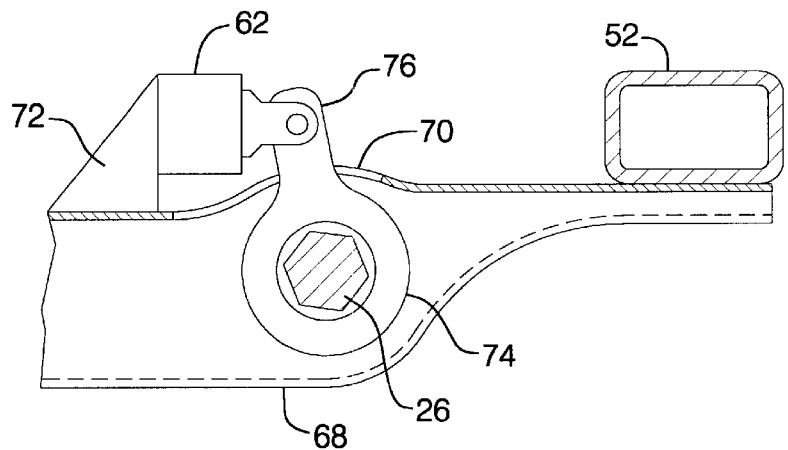
FIGS. 6 and 7 are views similar to FIGS. 3 and 4 showing, respectively, the mechanism of FIG. 5 in lowered and raised trim height positions.
Figure 7:
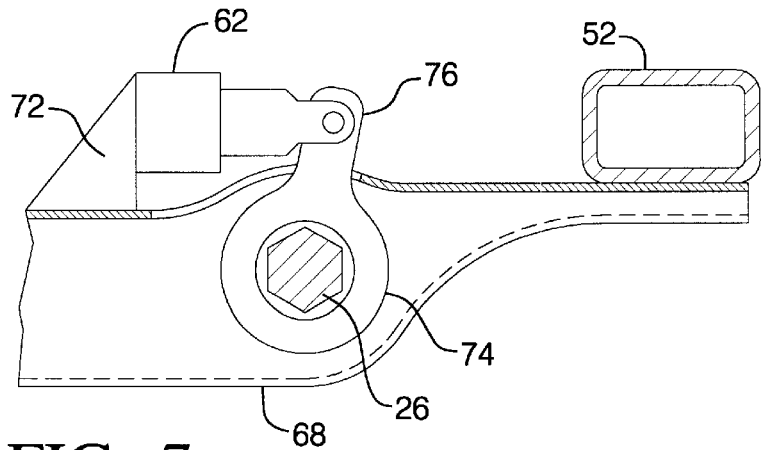

Referring now to FIGS. 5–7, a third alternative embodiment of power adjustable torsion bar suspension 66 is illustrated which is similar in many respects to the embodiment of FIGS. 2–4 and wherein like numerals indicate like parts. Suspension 66 includes a longitudinal member 52 with a modified cross member 68. The cross member includes a slot 70 in the U-shaped portion above the openings 28 and an actuator mount 72 spaced inwardly from the slot 70 on the upper side of the cross member 68. A modified torque lever 74 has a lever arm 76 that extends up through the slot 70 when the body of the lever is received within the cross member U-shaped portion and the hexagonal opening 30 is engaged by the rear end 26 of the torsion bar 14. The linear actuator 62 is connected with the end of lever arm 76 and extends between the lever arm and the mount 72 on the cross member.

When the linear actuator 62 is retracted, as shown in FIG. 6, the torsion force on the torsion bar is maintained at its minimum level so that the body of the vehicle is maintained in its low trim height position. To raise the body, the actuator 62 is extended to the position shown in FIG. 7 which rotates the torsion lever clockwise and increases the torque on the torsion bar. The vehicle body is thus raised to the high trim height position established by the change in position of the torque lever that increases the torsion bar force to a predetermined higher level.

Figure 8:
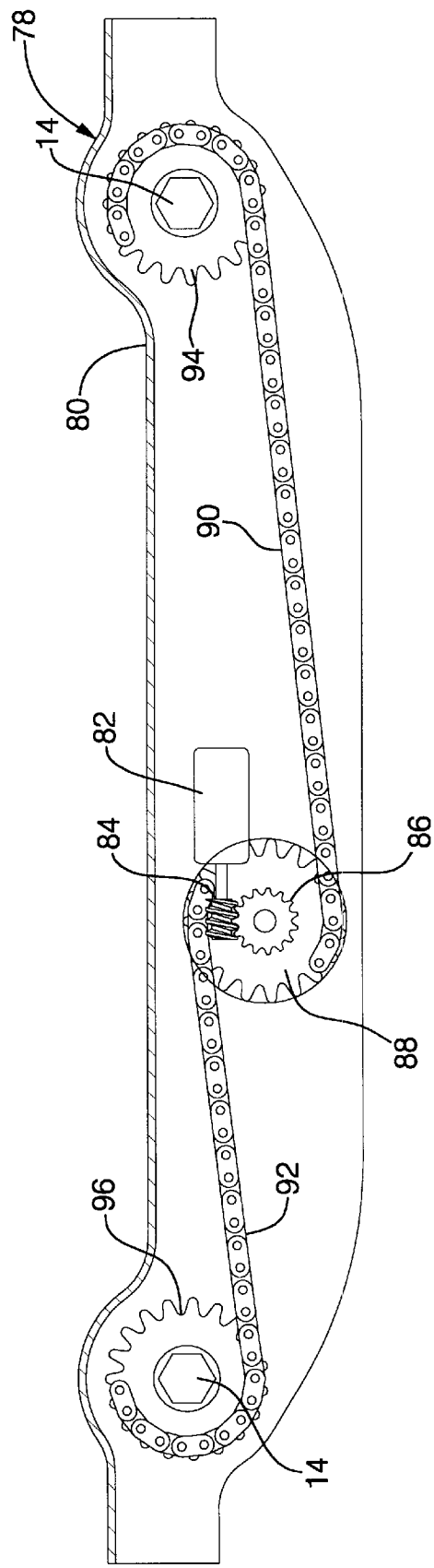
FIG. 8 is a rear cross-sectional view of a fourth embodiment of the invention.

FIG. 8 illustrates a fourth and somewhat different embodiment of power adjustable torsion bar suspension in accordance with the invention and generally indicated by the numeral 78. The adjusting mechanism for suspension 78 is contained within an enclosed cross member 80. An electric motor 82 mounted within the cross member 80 drives a worm 84 that engages a worm gear 86. The worm gear 86 connects with a sprocket 88 that in turn engages dual chains 90, 92. Chain 90 is wrapped counterclockwise around a sprocket 94 connected with a right hand torsion bar 14 and chain 92 is wrapped clockwise around a sprocket 96 connected with a left hand torsion bar 14.

When the electric motor 82 is stationary, the worm gearset and the chains maintain the torsion bars 14 at a fixed torque setting to maintain the trim height position of the vehicle in a predetermined setting, such as a low height position as shown in the position of the mechanism in FIG. 8. In order to raise the vehicle trim height, the electric motor is actuated to rotate the sprocket 88 clockwise, which in turn rotates sprocket 94 clockwise and sprocket 96 counterclockwise. The torsion bars 14 are thus both further twisted to increase their torque settings, thereby increasing the lifting force on the vehicle body and raising the body to the high trim height established by the suspension setting. Lowering of the trim height is accomplished similarly by reversing the direction of rotation of the electric motor to reduce the torsion force on the torsion bars.

FIGS. 9 and 10 illustrate a fifth embodiment of suspension 98 similar to that of FIG. 8 but with certain modifications. Sprockets 94 and 96 are carried on bearings 99 and engaged by the hexagonal rear ends 26 of torsion bars 14. Electric motor 82 is connected with a transmission 100 having an angled output drive shaft 102. The outer end of drive shaft 102 is splined and is supported by a bearing 104 mounted in the cross member 80. The splined end of the drive shaft engages a keyed drive sprocket 106 which is connected by a chain, not shown, with the adjuster sprocket 94. A floating drive sprocket 108 is mounted for free rotation on the drive shaft 102 and is connected by a chain, not shown, with the other adjuster sprocket 96. An adjusting bolt 110 mounted in a protrusion 112 from the keyed drive sprocket 106 is positioned to engage an abutment 114 on the floating drive sprocket 108.

Adjustment of the bolt 110 varies the relative rotational positions of the two drive sprockets 106, 108 and thereby varies the relative torque on the left and right side torsion bars 14 so as to obtain a proper balance or equalization of the torque forces on the torsion bars.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A vehicle suspension with power adjustable torsion bar trim height adjustment, said suspension comprising:

a torsion bar connected at one end to a wheel attachable support to form a torsional load carrying spring element for supporting a vehicle;

a body portion spaced from said support and supporting a second end of the torsion bar;

a torsion member connected to said second end of the torsion bar and oscillatable therewith to vary the torque setting of the torsion bar wherein the torsion member is a lever pivotally movable with said second end of the torsion bar;

an actuator acting between said body portion and said torsion member and operable to oscillate the torsion member between at least two operating positions having differing torque settings to vary the trim height of the vehicle suspension;

a power source connected to operate the actuator upon command to oscillate the torsion member between said operating positions and thereby raise or lower the running height of the vehicle; and a lock pivotally mounted on said body portion and having notches and wherein said lever further includes a lock protrusion operatively engageable with said notches of said lock to lock the lever in at least one of said operating positions upon deactivation of the power source.

2. A vehicle suspension as in claim 1 and including release means for releasing the lock means to allow movement of the lever between said operating positions.

3. A vehicle suspension as in claim 1 wherein said body portion is a cross member of a vehicle and said actuator is a linear actuator positioned between said torsion lever and said cross member.

4. A vehicle suspension as in claim 1 wherein said torsion member is an adjusting wheel rotatably movable with said second end of the torsion bar.

5. A vehicle suspension as in claim 4 wherein said actuator is a drive means connected for limited rotation of said adjusting wheel.

6. A vehicle suspension as in claim 5 wherein said power source is an electric motor connected with said drive means.

7. A vehicle suspension as in claim 6 wherein said drive means is a chain drive connected between said adjusting wheel and said electric motor for varying torque on said torsion bar by limited rotation of said adjusting wheel.

* * * * *